Patented Jan. 4, 1944

2,338,439

UNITED STATES PATENT OFFICE 2,338,439

PROCESS FOR THE PRODUCTION OF WHITE OPAQUE ENAMELS

Walter Kerstan, Frankfort-on-the-Main, Germany; vested in the Alien Property Custodian No Drawing. Application September 24, 1940, Serial No. 358,182. In Germany September 30, 1939

3 Claims. (Cl. 106—41)

The invention relates to the production of white opaque enamels using gas opacifiers more particularly in the use of opacifiers made from organic compounds. The process is especially suitable for enamels which are either poor in boron or entirely free of boron.

Gas opacification depends as is known upon the fact that substances which can be decomposed with evolution of gas are added to an enamel mixture which on firing of the enamel produce a white opacity by formation of small gas bubbles.

The most varied substances have already been suggested as gas opacifiers, for instance, coloring agents, fatty acids and their salts, aromatic carbonic acids and their salts, naphtholes, resins, pitches, tars, asphalts and the like.

Careful investigations and experiments have shown that the effect of gas opasifiers is greatly dependent upon the composition of enamel mixture, especially in view to the viscosity of enamel melts. Hence quite special enamels were often used in order to obtain a uniform opacity with the known gas opacifiers. The composition of these special enamels was adapted to the used gas opacifiers in such manner as to soften the enamels at definite temperatures and to obtain melts of definite viscosity which prevented the escape of the formed gas bubbles.

Through further investigations and experiments I have found out that the effect of the known gas opacifiers substantially depends on the content of boric acid or other boron containing substances such as borax or the like which are present in the enamels mixtures or frits.

Now I have found that a certain group of substances, i. e., non-gaseous unsaturated organic compounds such as vinylic compounds, acrylic compounds or the like or their natural or artificial polymerisates yield to an excellent and especially very uniform opacity if such enamel mixtures are used as contain no boron compounds, for instance, boric acid, and are not suitable or only badly suitable for gas opacification by known gas opacifying agent.

Suitable opacifiers are, for instance, vinyl acetate, vinyl chloride or the like, vinyl ether, furthermore esters, amides or nitriles of acrylic acid and its homologues, for instance methacrylic acid, styrol or the like. The unsaturated organic compounds may be used either alone or in mixtures or in form of their polymerisates, mixed polymerisates or polymerisate mixtures. It is also possible to use the aforesaid unsaturated compounds which are only partially polymerized either alone or in mixtures. Especially suitable are, for instance, polymerisates of unsaturated hydrocarbons and their derivatives, for instance, isoprene-, butadien- or chloroprene polymerisates. Natural products such as natural caoutchouc, rubber, gutta percha, balata have also proved advantageous.

The gas opacifiers according to my invention may be used either alone or in mixture. Unsaturated compounds may be employed, for instance, together with polymerisates wholly or partially polymerized compounds or with both these substances. I have made the surprising observation that natural rubber or synthetically produced rubberlike substances such as, for instance, Buna (copolymer of vinyl cyanide and butadiene), are especially advantageous if frits are used which are either poor in boron or entirely boron free.

In accordance with kind and quality the white opacifiers may be used as such or in form of solutions. Solvents are, for instance, organic substances such as gasoline, benzole, and other hydrocarbons, chlorinated hydrocarbons, alcohols, esters, ketones or the like. These opacifiers may also be used in natural or artificial dispersions or emulsions, for instance, in the form of latex.

The process according to my invention may be carried out by mixing enamel clay with liquid opacifiers or solutions or emulsions thereof. After the evaporation of the solvents—either wholly or partly—the mixture is added to the mill. Thus, for instance, ordinary enamel clay may be mixed with a solution of a butadien polymerisate or polystyrol in benzene or the like whereby about 10 grs. polymerisate are added to 100 grs. enamel clay. The ingredients are mixed intimately resulting in a thin pulpy mixture; the solvent is distilled off and the remaining mixture is worked up accordingly.

The process has been proved excellent for boron free or boron poor enamels, especially industrial enamels. The extraordinarily uniform decomposition of the gas opacifiers according to my invention is probably based on the fact that various procedures such as cracking, polymerising, depolymerising and so on proceed either alternately or simultaneously.

The following are examples of the make-up of frits to be employed according to my invention:

1

| | Parts of weight |
|---|---|
| Feldspar | 50 |
| Quartz | 5 |
| Borax | 18[1] |
| Sodium carbonate | 8 |
| Sodium nitrate | 2 |
| Sodium silicofluoride | 10 |
| Fluor spar | 2 |

[1] Corresponding to 2,8 boric acid anhydride.

2

| | Parts of weight |
|---|---|
| Feldspar | 50 |
| Quartz | 5 |
| Sodium carbonate | 16 |
| Sodium nitrate | 2 |
| Sodium silicofluoride | 10 |
| Fluor spar | 2 |

For instance, I proceed as follows:

25 grs. of buna or crêpe caoutchouc are dissolved in 1000 cc. benzene and at a temperature of 40° C. introduced into a shaking apparatus. Thereafter the solution is finely ground with 1000 grams of clay in a porcelain grinding mill.

The resulting clay slip is then dried at a temperature between 60 and 80° C., and the dry residue ground to a fineness of 3600 mesh. The so formed gas opacifier is added to the enamel frit in a quantity of about 2%, corresponding to an addition of 0.05% buna or caoutchouc. If desired, more clay, for instance, about 6% more may be added to the mill. Enamelling and firing is carried out as usual.

What I claim is:

1. In a method of producing an article having thereon a coating of clouded vitreous enamel having an opacity substantially greater than that which could be produced with the frit used and clay alone, and in which a substantial part of the increased opacity is contributed by gas bubbles retained in the enamel, incorporating in the enamel slip containing clay, less than 5% of a boron compound measured as boric acid and a gas-evolving agent which, upon the firing of the enamel, evolves gases which are retained in the enamel at the firing temperature thereof in the form of bubbles of such sizes and number as to contribute a substantial increase to the opacity, said gas-evolving agent being selected from the group consisting of vinyl compounds and polymers thereof.

2. The method of producing an article having thereon a coating of clouded vitreous enamel having an opacity substantially greater than that which could be produced with the frit used and clay alone, and in which a substantial part of the increased opacity is contributed by gas bubbles retained in the enamel, which comprises applying to the article a slip comprising an enamel frit, clay, less than 5% of a boron compound measured as boric acid and a gas-evolving agent which, upon the firing of the enamel, evolves gases which are retained in the enamel at the firing temperature thereof in the form of bubbles of such sizes and number as to contribute a substantial increase to the opacity, said gas-evolving agent being selected from the group consisting of vinyl compounds and polymers thereof.

3. An enamel slip for clouded enamels for articles to produce thereon a coating of clouded vitreous enamel having an opacity substantially greater than that which could be produced with the frit used and clay alone, and in which a substantial part of the increased opacity is contributed by gas bubbles retained in the enamel, comprising a ground mixture of enamel frit, clay, water, less than 5% of a boron compound measured as boric acid and a gas-evolving agent which, upon the firing of the enamel, evolves gases which are retained in the enamel at the firing temperature thereof in the form of bubbles of such sizes and number as to contribute a substantial increase to the opacity, said gas-evolving agent being selected from the group consisting of vinyl compounds and polymers thereof.

WALTER KERSTAN.